United States Patent Office 3,094,534
Patented June 18, 1963

3,094,534
PROCESS FOR PREPARING NOVEL
CYCLIC AMINES
Rudolf Griot, Basel, and Theodor Wagner-Jauregg, Zofingen, Switzerland, assignors to Siegfried Aktiengesellschaft, Zofingen, Switzerland
No Drawing. Filed Mar. 6, 1961, Ser. No. 93,333
14 Claims. (Cl. 260—313)

The present application is a continuation in part of our earlier copending application Ser. No. 724,518, filed March 28, 1958, now abandoned.

The present invention relates to the preparation of therapeutically valuable compounds and intermediates by cyclising $\Delta^2$-cyclopentenyl acetone oxime, if desired reducing the unsaturated products so obtained, and N-alkylating the saturated or unsaturated cyclic compounds.

According to the present invention, $\Delta^2$-cyclopentenyl acetone oxime

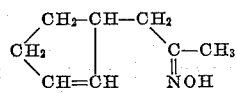

is treated with zinc dust in glacial acetic acid at elevated temperatures in the range from about 65° C. to about 110° C. to obtain a mixture of compounds (I) and (E) corresponding to the following formulas:

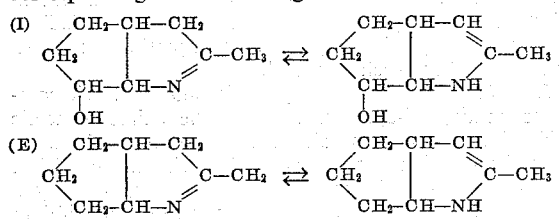

This mixture may be separated by usual means, e.g. fractional recrystallisation from appropriate solvents or fractional distillation to yield the individual compounds (I) and (E). If desired, the unsaturated cyclic amines (I) and (E) may be reduced to yield the corresponding saturated compounds (II) and (F)

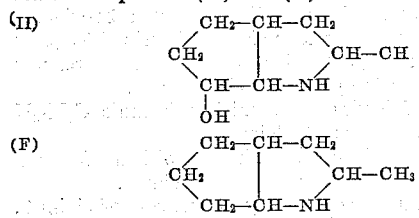

In a further process step the above cyclic amines are N-alkylated, e.g. by means of an alkyl halide, preferably a methyl halide, to produce the corresponding N-alkyl derivatives having the general formulas

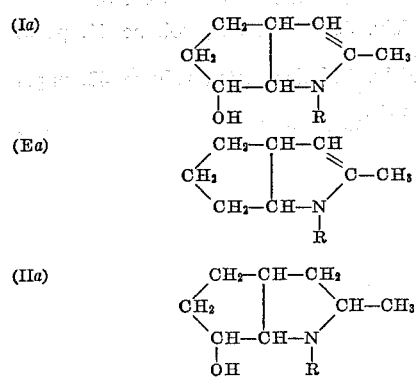

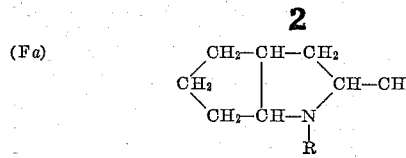

in which R represents an alkyl radical containing from 1 to 4 carbon atoms.

The optional reduction of the unsaturated amines may be effected by use of lithium aluminum hydride in an appropriate solvent, e.g. tetrahydrofuran, of amalgamated zinc and hydrochloric acid, or by catalytical hydrogenation, e.g. in presence of palladium or platinum catalysts at elevated or normal pressures in suitable solvents.

The compounds of the present invention are useful therapeutics, e.g. for treatment of Parkinson's disease and injuries caused by nicotine. Thus, the hydroiodide of 3,N-dimethyl-8-hydroxy-2-azobicyclo-[3,3,0]-octane e.g. in the mice test by subcutaneous administration of 27 mg./kg. protected from death 50% of the test animals to which 30 minutes before 65 mg./kg. of nicotine tartrate had been injected intraperitoneally. For comparison, the same protective doses of Parpanit (1-phenylcyclopentane carboxylic acid 2-diethylaminoethylester hydrochloride) and Diparcol (10-(2-diethylaminoethyl)-phenothiazine) were 200 mg. and 400 mg./kg. respectively.

*Example 1*

To 460 g. of $\Delta^2$-cyclopentenyl acetone oxime dissolved in one liter of glacial acetic acid 423 g. of zinc dust are added portionwise at a temperature of about 50° C. with vigorous stirring, whereupon the temperature is raised to 80° C. and left at this temperature for further 16 hours. The solution is filtered while still hot and then the acetic acid is distilled off under reduced pressure. The residue is extracted with petroleum ether to remove unreacted starting materials and thereupon made alkaline by addition of 30% sodium hydroxyde solution. The separating oil is removed and the aqueous phase extracted with chloroform. The combined oil and chloroform extracts are dried over anhydrous sodium sulfate. After removal of the solvent by distillation the residue is distilled under high vacuum. A fraction of 212 g. boiling beyond 100°/0.3 mm. is recovered which solidifies almost completely. Recrystallisation of this fraction from hot benzine yields crystalline 3-methyl-8-hydroxy-2-azabicyclo-[3,3,0]-octene-(2) resp. -(3) (I). After evaporation of the mother liquors there remain 14 g. of a fraction boiling at 36° C./3 mm.; $n_D^{20}$=1.4750 (3-methyl-2-azabicyclo-[3,3,0]-octene-(2) resp. -(3) (E), as well as a further crop of (I). The total yield of amine (I) is 115 g., i.e. 25% calculated on the starting oxime or 31% calculated on the reacted oxime.

Compound (I) may be recrystallised from ethyl acetate or benzine. It forms colorless, triclinic prisms melting at 75° C. It sublimes under reduced pressure and is readily soluble in water, ether, chloroform, alcohol, methanol and tetrahydrofuran.

*Analysis.*—Calc. for $CH_{13}ON$: C, 69.03%; H, 9.37%; N, 10.05%. Found: C, 69.10%; H, 9.42%; N, 10.10%.

By treatment with suitable optically active acids, e.g. tartaric acid the optical antipodes of (I) are obtained as oily substances. $[\alpha]_D^{20}$=+157°, resp. −157° ($CHCl_3$, c.=1.3).

Amine (E) alternatively may be isolated from the prerun of the above distillation under high vacuum. Its separation from amine (I) further can be effected due to its volatility with steam. It can be purified by distillation over metallic sodium. B.P. 167° C., $n_D^{20}$=1.4754, $d^{20}$=0.9349.

*Analysis.*—Calc. for $CH_{13}N$: C, 78.1%; H, 10.65%. Found: C, 78.4%; H, 10.81%.

The picrate melts at 181° C.

Example 2

A solution of 0.1 mole (13.9 g.) 3-methyl-8-hydroxy-2-azabicyclo-[3,3,0]-octene (I) in glacial acetic acid was hydrogenated in the presence of a palladium-norite-catalyst under about 500 p.s.i. at 70° C. 3-methyl-8-hydroxy-2-azabicyclo-[3,3,0]-octane (II) was obtained in theoretical yield, M.P.=75° (from benzine). The compound sublimes readily and has similar solubility properties as compound I. Mixed melting point with (I): 55–58° C.

*Analysis.*—Calc. for $CH_{15}ON$: C, 68.0%; H, 10.71%; N, 9.9%. Found: C, 67.6%; H, 10.65%; N, 9.9%.

Example 3

A solution of 10 g. of amine (I) was dropped into a suspension of 1.5 g. of $LiAlH_4$ in tetrahydrofuran. The mixture was refluxed for about 5 hours and then recovered in the usual manner, whereby the saturated amine (II) was obtained in quantitative yield. The product was identical with that of Example 2.

Example 4

One mole of compound I was refluxed for about 8 hours with amalgamated zinc and hydrochloric acid. The dihydro compound (II) was obtained in quantitative yield. M.P.=75° C.; the picrate melts at 158° C.

Example 5

0.304 g. of 3-methyl-2-azabicyclo-[3,3,0]-octene (E) were hydrogenated in 10 ml. of glacial acetic acid in presence of 50 mg. $PtO_2$ (Adams catalyst). After 30 minutes the hydrogen uptake stopped. By usual recovery measures there was obtained 3-methyl-2-azabicyclo-[3,3,0]-octane (F) as a liquid boiling at 157 to 158° C., $nd^{20}$=1.4682, $d_{20}^{20}$=0.9023. The picronolate melts at 233° C.

Example 6

By gently heating compound (I) with methyl iodide the hydroiodide of the N-monomethyl-derivative of (I) is formed, which after recrystallisation from methanol/ethyl acetate melts at 133° C.

With excessive methyl iodide in 2 N NaOH the iodomethylate is obtained which after crystallisation from alcohol or ether melts at 212–214° C.

Example 7

In a similar manner as described in Example 6 the N-methyl derivative of (II) is obtained. The hydroiodide of N,3-dimethyl-8-hydroxy-2-azabicyclo-[3,3,0]-octane melts at 146° C.

Similarly, the hydroiodide of the N-methyl derivative of compound F is obtained which has a melting point of 135–137° C. Further in analogous way the N-ethyl-3-methyl-8-hydroxy-2-azabicyclo-[3,3,0]-octane (M.P. of the hydrochloride=112° C.) may be prepared.

We claim:

1. A process for preparing cyclic amines, which comprises treating $\Delta^2$-cyclopentenyl acetone oxime in acetic acid with zinc dust at elevated temperatures and recovering and separating the amines thus produced from the reaction mixture.

2. A process for preparing cyclic amines which comprises treating $\Delta^2$-cyclopentenyl acetone oxime in acetic acid with zinc dust at elevated temperatures, isolating from the reaction mixture an amine with the empirical formula of $C_8H_{13}NO$ and reducing this compound by a reagent selected from the group consisting of lithium aluminum hydride, hydrogen in the presence of a palladium catalyst, hydrogen in the presence of a platinum catalyst, and zinc and hydrochloric acid.

3. A process for preparing cyclic amines which comprises treating $\Delta^2$-cyclopentenyl acetone oxime in acetic acid with zinc dust at elevated temperatures, isolating from the reaction mixture an amine with the empirical formula of $C_8H_{13}NO$ and reducing this compound by a reagent selected from the group consisting of lithium aluminum hydride, hydrogen in the presence of a palladium catalyst, hydrogen in the presence of a platinum catalyst, and zinc and hydrochloric acid, to yield 3-methyl-8-hydroxy-2-azabicyclo-octane, and N-alkylating the product of said reduction stage by use of a methyl halide.

4. A process for preparing cyclic amines which comprises treating $\Delta^2$-cyclopentenyl acetone oxime in acetic acid with zinc dust at elevated temperatures, isolating from the reaction mixture an amine with the empirical formula of $C_8H_{13}NO$, N-alkylating this compound by use of a methyl halide, and reducing the N-alkylated product by a reagent selected from the group consisting of lithium aluminum hydride, hydrogen in the presence of a palladium catalyst, hydrogen in the presence of a platinum catalyst, and zinc and hydrochloric acid.

5. A process for preparing cyclic amines which comprises treating $\Delta^2$-cyclopentenyl acetone oxime in acetic acid with zinc dust at elevated temperatures, isolating from the reaction mixture an amine with the empirical formula of $C_8H_{13}N$ and reducing this compound by a reagent selected from the group consisting of lithium aluminum hydride, hydrogen in the presence of a palladium catalyst, hydrogen in the presence of a platinum catalyst, and zinc and hydrochloric acid.

6. A process for preparing cyclic amines which comprises treating $\Delta^2$-cyclopentenyl acetone oxime in acetic acid with zinc dust at elevated temperatures, isolating from the reaction mixture an amine with the empirical formula of $C_8H_{13}N$ and reducing this compound by a reagent selected from the group consisting of lithium aluminum hydride, hydrogen in the presence of a palladium catalyst, hydrogen in the presence of a platinum catalyst, and zinc and hydrochloric acid to yield 3-methyl-2-azabicyclo-octane, and N-alkylating the product of said reduction stage by use of a methyl halide.

7. The process of claim 1, wherein the amines are separated by fractional crystallisation from benzine.

8. A process according to claim 1 wherein 4.60 parts by weight of $\Delta^2$-cyclopentenyl acetone oxime are reacted with about 4.23 parts by weight of zinc dust.

9. A compound having the empirical formula $C_8H_{13}N$ produced by the process of claim 1.

10. A compound having the empirical formula $C_8H_{13}NO$ produced by the process of claim 1.

11. The compound produced by the process of claim 2.
12. The compound produced by the process of claim 3.
13. The compound produced by the process of claim 5.
14. The compound produced by the process of claim 6.

References Cited in the file of this patent

Griot et al.: Helv. Chimica Acta., volume 41, pages 867–881 (1958).

Griot et al.: Helv. Chimica Acta., volume 42, pages 121–127, February 1959.

Griot: Helv. Chimica Acta., volume 42, pages 67–72 (1959).